United States Patent
Choo et al.

(10) Patent No.: US 9,654,326 B2
(45) Date of Patent: May 16, 2017

(54) WIRELESS TRANSCEIVER WITH TX/FBRX SEQUENTIAL QMC CALIBRATION USING SEPARATE/SHARED PLLS

(71) Applicant: Texas Instruments Incorporated, Dallas, TX (US)

(72) Inventors: Hunsoo Choo, Plano, TX (US); Charles K. Sestok, IV, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/093,724

(22) Filed: Apr. 7, 2016

(65) Prior Publication Data
US 2016/0234055 A1    Aug. 11, 2016

Related U.S. Application Data (63) Continuation of application No. 14/822,867, filed on Aug. 10, 2015, now abandoned.
(Continued)

(51) Int. Cl.
*H04B 1/38* (2015.01)
*H04L 25/49* (2006.01)
(Continued)

(52) U.S. Cl.
CPC .............. *H04L 27/364* (2013.01); *H04B 1/30* (2013.01); *H04B 17/14* (2015.01); *H04L 7/0331* (2013.01); *H04L 27/3863* (2013.01)

(58) Field of Classification Search
CPC .......... H04B 1/0475; H04B 2001/0425; H04B 2001/0433; H04B 1/44; H04B 1/403;
(Continued)

(56) References Cited

U.S. PATENT DOCUMENTS 7,248,625 B2 * 7/2007 Chien ................. H04B 1/30
375/219
7,830,954 B2 * 11/2010 Welz ................. H03D 3/009
375/219

(Continued)

*Primary Examiner* — Khanh C Tran
(74) *Attorney, Agent, or Firm* — Andrew Viger; Charles A. Brill; Frank D. Cimino (57) ABSTRACT

A direct conversion wireless transceiver is configured for TX/FBRX sequential QMC calibration (coefficient generation) using separate/shared PLLs. A TX LO drives upconversion, and an RX LO drives downconversion. TX/RX digital QMC compensators compensate for IQ mismatch (with optional DPD compensation), and QMC calibration is used to calibrate the TX/RX QMC filter coefficients based on a QMC calibration procedure. The TX LO signal source is a TX PLL, and the RX LO signal source is selectively the TX PLL or a separate FBRX PLL. A QMC controller performs QMC calibration to generate calibrated TX/FBRX QMC filter coefficients, including: disconnecting the TX PLL from, and connecting the FBRX PLL to, the RX LO; generating calibrated TX QMC filter coefficients; generating calibrated FBRX QMC filter coefficients; disconnecting the FBRX PLL from, and connecting the TX PLL to, the RX LO; generating re-calibrated FBRX QMC filter coefficients.

15 Claims, 5 Drawing Sheets

Related U.S. Application Data (60) Provisional application No. 62/035,248, filed on Aug. 8, 2014.

(51) Int. Cl.
*H04L 27/36* (2006.01)
*H04B 1/30* (2006.01)
*H04L 27/38* (2006.01)
*H04B 17/14* (2015.01)
*H04L 7/033* (2006.01)

(58) Field of Classification Search
CPC ..... H04B 1/401; H04L 27/364; H04L 27/266; H04L 27/367; H04L 27/368; H04L 27/38; H04L 27/2089; H04L 27/2626; H04L 27/2647; H04L 27/3863; H03C 2200/0058; H03F 1/3247
USPC ....... 375/219, 221, 226, 229, 232, 285, 295, 375/346, 350; 455/63.1, 67.11, 67.13, 455/68–69, 114.2–114.3, 296
See application file for complete search history.

(56) References Cited

U.S. PATENT DOCUMENTS

| | | | | |
|---|---|---|---|---|
| 7,856,048 | B1* | 12/2010 | Smaini | H04B 1/40 330/2 |
| 8,565,343 | B1* | 10/2013 | Husted | H04B 1/0475 375/297 |
| 2002/0193140 | A1* | 12/2002 | Behrens | H04B 1/0003 455/553.1 |
| 2005/0069050 | A1* | 3/2005 | Ding | H03C 3/40 375/296 |
| 2009/0054016 | A1* | 2/2009 | Waheed | H03F 1/3247 455/114.3 |
| 2012/0269293 | A1* | 10/2012 | Peng | H03F 1/3247 375/297 |
| 2012/0300818 | A1* | 11/2012 | Metreaud | H04B 1/30 375/219 |
| 2013/0058388 | A1* | 3/2013 | Muhammad | H04B 15/04 375/222 |
| 2013/0208827 | A1* | 8/2013 | Muhammad | H04L 27/2089 375/297 |
| 2014/0362955 | A1* | 12/2014 | Muhammad | H04L 27/3863 375/343 |
| 2015/0030102 | A1* | 1/2015 | Hormis | H04L 1/243 375/296 |

\* cited by examiner

WIRELESS TRANSCEIVER WITH TX/FBRX SEQUENTIAL QMC CALIBRATION USING SEPARATE/SHARED PLLS

CROSS-REFERENCE TO RELATED APPLICATIONS

Continuation of U.S. application Ser. No. 14/822,867, filed 2015 Oct. 10 (now abandoned), which claims the benefit under USC 119(e) to U.S. Provisional Application 62/035,248, filed 2014 Aug. 8.

BACKGROUND

Technical Field

This Patent Document relates generally to direct-conversion wireless transceiver design including IQ mismatch compensation.

Related Art

In wireless transceivers, direct conversion can be used for the transmitter (TX) and/or receiver (RX). Direct conversion (zero/low IF) wireless architectures, based on IQ modulation/demodulation and RF upconversion/downconversion, have a number of advantages over IF (heterodyne) architectures.

For wireless base-station applications, the transceiver must meet stringent requirements on out-of-band emission in the transmitter. For this reason, direct conversion transmitter designs use digital compensation for TX non-linearities and IQ mismatch, and include a feedback receiver (FBRX) that captures data required for such compensation.

TX non-linearities are compensated by digital pre-distortion (DPD). IQ mismatch is compensated by digital filtering (IQ mismatch compensation or QMC). To reduce phase noise distortion for DPD processing, the TX LO (local oscillator) and FBRX LO can be generated using the same PLL (phase locked loop).

One approach to achieving acceptable TX DPD and QMC compensation, is to use an IF (rather than direct conversion) FBRX. Such an approach avoids introducing FBRX IQ imbalance into the TX path (i.e., avoiding the requirement for FBRX QMC).

While this Background information references wireless base station application, the Disclosure in this Patent Document is not limited to such applications, but is more generally directed to direct conversion wireless architectures.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes a direct conversion wireless transceiver configured for TX/FBRX sequential QMC calibration (coefficient generation) using separate/shared PLLs. According to aspects of the Disclosure, the wireless transceiver includes a TX path includes a TX LO driving upconversion, and an FBRX path includes an RX LO driving downconversion. TX/RX digital compensators include TX/RX QMC compensators that perform QMC compensation to compensate for IQ mismatch based on TX/RX QMC filter coefficients, and QMC calibration to calibrate the TX/RX QMC filter coefficients based on a QMC calibration procedure. The TX LO signal source is a TX PLL, and the RX LO signal source is selectively the TX PLL or a separate RX PLL. A QMC controller performs QMC calibration to generate calibrated TX/FBRX QMC filter coefficients, including: (A) disconnecting the TX PLL from, and connecting the FBRX PLL to, the RX LO; (B) generating calibrated FBRX QMC filter coefficients; (C) generating calibrated TX QMC filter coefficients; (D) disconnecting the FBRX PLL from, and re-connecting the TX PLL to, the RX LO; and (E) generating re-calibrated FBRX QMC filter coefficients. The TX digital compensator can be configured to perform DPD compensation (after QMC compensation).

Other aspects and features of the invention claimed in this Patent Document will be apparent to those skilled in the art from the following Disclosure.

BRIEF DESCRIPTION OF THE DRAWINGS

FIGS. 5A-5E illustrate an example implementation of the methodology for TX/FBRX sequential QMC calibration using separate/shared TX/FBRX PLLs, including sequential calibration/re-calibration of TX and FBRX QMC filter coefficients.

DETAILED DESCRIPTION

This Description and the Drawings constitute a Disclosure for a direct conversion wireless transceiver architecture with TX/FBRX sequential QMC calibration using separate/shared PLLs, including example embodiments, and including various technical features and advantages.

As used in this Disclosure, direct conversion refers to zero and low IF (intermediate frequency) conversion based on quadrature (IQ) modulation and demodulation, with RF (radio frequency) upconversion and downconversion.

In brief overview, the Disclosed direct conversion wireless transceiver is configured for TX/FBRX sequential QMC calibration (coefficient generation) using separate/shared PLLs. A TX path includes a TX LO driving upconversion, and an FBRX path includes an RX LO driving downconversion. TX/RX digital compensators include TX/RX QMC compensators that perform QMC compensation to compensate for IQ mismatch based on TX/RX QMC filter coefficients, and QMC calibration to calibrate the TX/RX QMC filter coefficients based on a QMC calibration procedure. The TX LO signal source is a TX PLL, and the RX LO signal source is selectively the TX PLL or a separate RX PLL. A QMC controller performs QMC calibration to generate calibrated TX/FBRX QMC filter coefficients, including: (A) disconnecting the TX PLL from, and connecting the FBRX PLL to, the RX LO; (B) generating calibrated FBRX QMC filter coefficients; (C) generating calibrated TX QMC filter coefficients; (D) disconnecting the FBRX PLL from, and connecting the TX PLL to, the RX LO (FBRX image reappears); (E) generating re-calibrated FBRX QMC filter coefficients. The TX digital compensator can be configured to perform DPD compensation (after QMC compensation).

Figure 1:
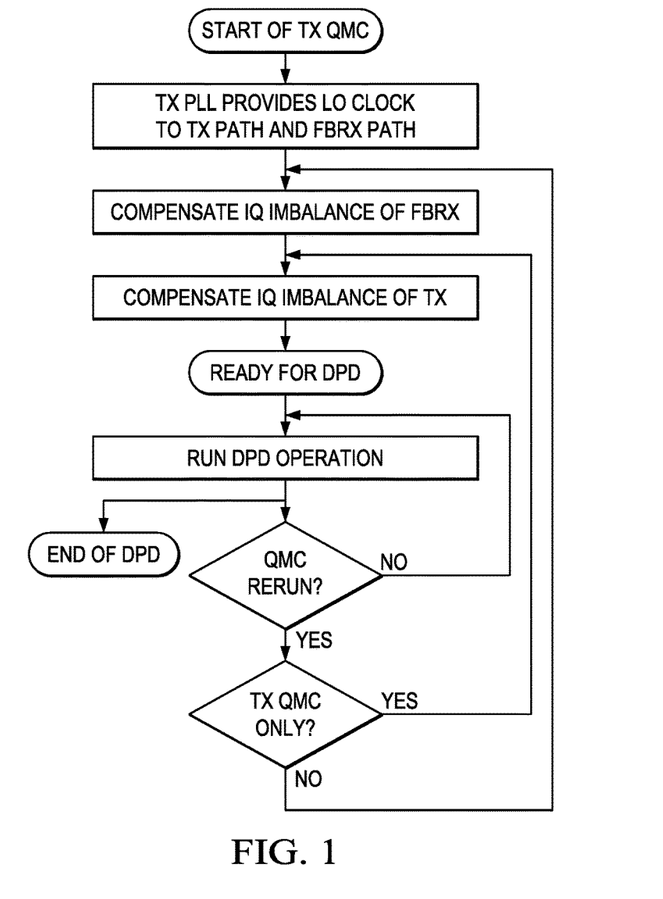
FIG. 1 illustrates, for a direct conversion transceiver TX/RX/FBRX using both DPD (digital pre-distortion) and QMC (IQ imbalance) compensation, an example embodiment of normal mode operation in which FBRX/TX QMC (IQ imbalance) compensation is performed prior to DPD.

FIG. 1 illustrates, for a direct conversion transceiver TX/RX/FBRX using both DPD (digital pre-distortion) and QMC (IQ imbalance) compensation, an example embodiment of normal mode operation in which FBRX/TX QMC (IQ imbalance) compensation is performed prior to DPD.

For a transmission with a high output power, it is required for a DPD algorithm to linearize the PA for higher linearity. Before DPD, it is necessary to idealize both transmission path and feedback receive path so that no other impairments from TX and RX affects the DPD adaptation. These impairments include IQ imbalance of TX and RX paths. Hence, QMC (IQ imbalance) compensation is always run before DPD adaptation.

For the example embodiment, QMC compensation is implemented in a DSP (digital signal processor). Periodic QMC calibration generates filter coefficients for QMC compensation processing.

As described in connection with FIGS. 2-4 and 5A-5E, according to the TX/FBRX sequential QMC calibration methodology (using separate/shared), the first set of FBRX QMC coefficients and the TX QMC coefficients are updated using separate PLLs to generate the respective LO signals. After the FBRX and TX QMC coefficients are fixed, the FBRX LO signal is switched to the same PLL source as the TX LO. Because the new LO source can change the gain and phase mismatch generated by the FBRX mixer, introducing IQ mismatch (causing FBRX images to re-appear), the FBRX QMC coefficients are then separately re-calibrated in this Shared-PLL configuration (such as using a least squares method).

Figure 2:
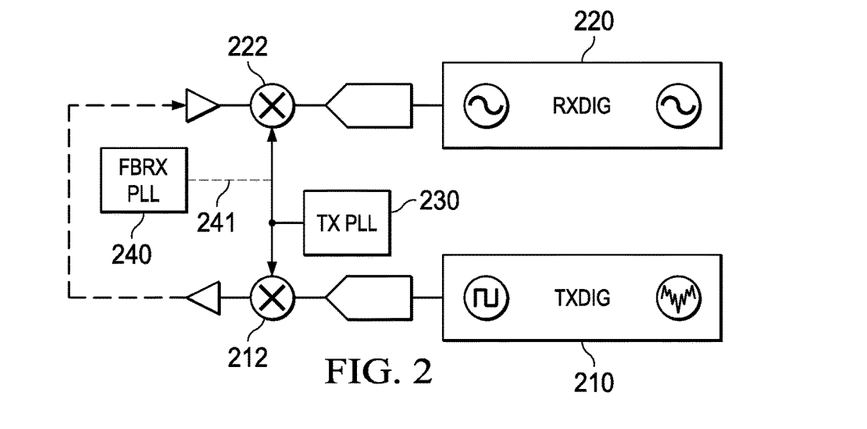
FIG. 2 illustrates an example functional embodiment of a direct conversion transceiver TX/RX/FBRX architecture, with LO generation using a shared TX PLL during normal TX/RX (after QMC and DPD compensation), such as for the purpose of reducing phase noise distortion for DPD compensation processing.

An example approach for joint TX/FBRX QMC calibration using separate PLLS is described in U.S. Pat. No. 8,311,083 and U.S. application Ser. No. 14/814,197, the disclosures of which are incorporated by reference. In particular, Application '197 describes separate FBRX and TX QMC calibration using phase rotation (using separate PLLs outside the respective LO distribution paths). This example approach is referred to in this Disclosure as Joint TX/FBRX QMC Calibration FIG. 2 illustrates an example functional embodiment of a direct conversion transceiver TX/RX/FBRX architecture 200 (TX 210, RX/FBRX 220), with LO generation using a shared TX PLL 230 during normal TX/RX (after QMC and DPD compensation). To reduce phase noise distortion for the computation of the DPD, it is desirable that the FBRX LO that drives the FBRX mixer 222 is generated by the same PLL as the TX LO that drives the TX mixer 212. As illustrated, TX PLL 230 drives both the TX and FBRX mixers 212, 222, with a separate FBRX PLL 240 disconnected (dashed line 241).

Figure 3:
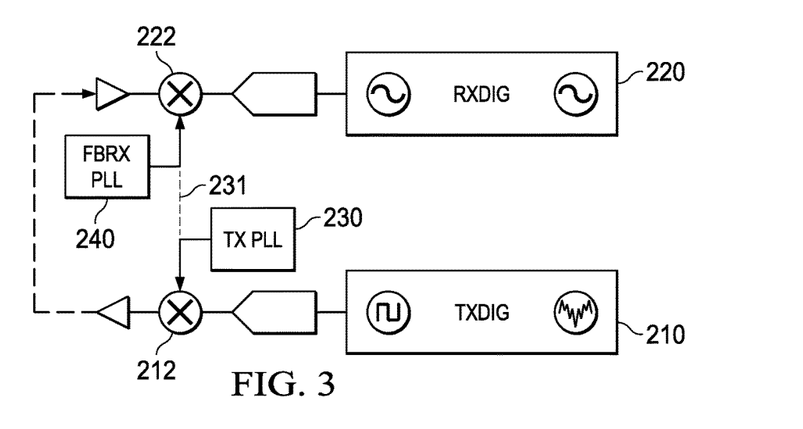
FIG. 3 illustrates an example functional embodiment of a direct conversion transceiver TX/RX/FBRX architecture, with separate LO generation using separate TX and FBRX PLLs during TX/FBRX sequential QMC (coefficient) calibration.

FIG. 3 illustrates an example functional embodiment of a direct conversion transceiver TX/RX/FBRX architecture 300, with separate LO generation using separate TX and FBRX PLLs 230, 240 during TX/FBRX sequential QMC (coefficient) calibration.

TX/FBRX LO generation using separate TX/FBRX PLLs 230, 240 can be used with the above referenced Joint TX/FBRX QMC Calibration methodology. As noted, separate TX/FBRX PLLs are allow phase rotation using PLL adjustments outside the LO distribution paths, separately driving the FBRX and TX mixers. This Joint TX/FBRX QMC Calibration approach relies on FBRX phase rotation to rotate the phase of FBRX LO without affecting the IQ mismatch in the FBRX path. Because of the requirement of the phase rotation, and that the phase rotation be accomplished outside the LO distribution paths, separate TX and FBRX PLL's 230, 240 are used for TX and FBRX QMC calibration.

However, as noted, the requirements on the performance of QMC compensation are stringent, and changing the LO waveform can change the gain and phase IQ mismatch, causing significant changes in the required QMC filtering if the PLL generating the LO signal is changed. Thus, FBRX QMC coefficients jointly generated with the TX QMC coefficients using separate FBRX and TX PLLs, such as the above referenced Joint TX/FBRX QMC Calibration technique (requiring phase rotation) will be degraded/invalid when the transceiver is re-configured with the TX PLL 230 signal source used to generate the FBRX LO driving the FBRX mixer 222, because of degradation of image suppression performance (see, the description of FIGS. 5B/5C and 5D).

Figure 4:
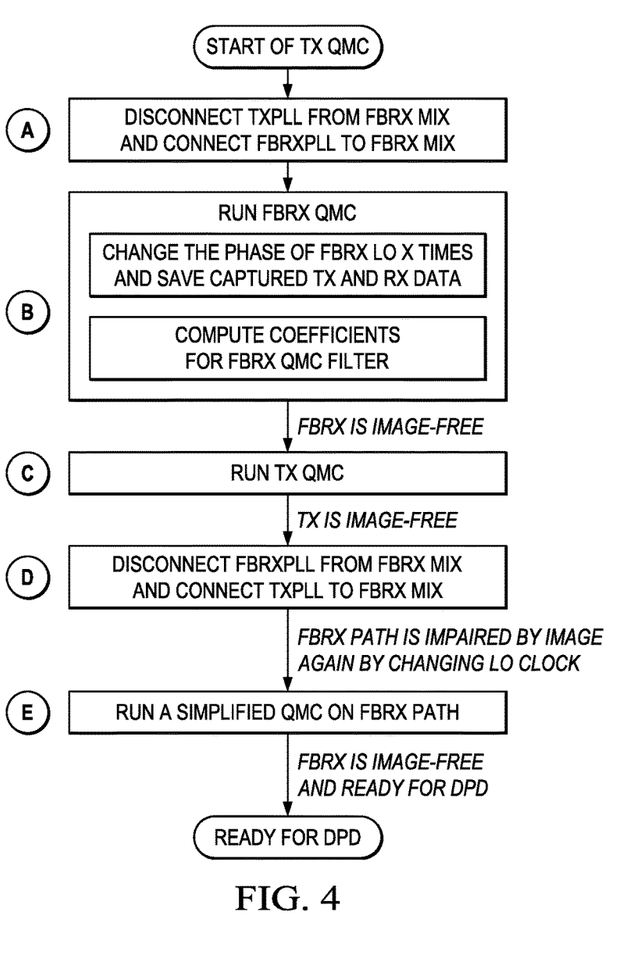
FIG. 4 illustrates an example embodiment of the methodology for TX/FBRX sequential QMC calibration using separate/shared TX/FBRX PLLs, including calibration of TX and FBRX QMC filter coefficients for normal TX operation with DPD compensation based on TX and FBRX signal path IQ modulation/demodulation using a shared TX PLL.
Figure 5A:
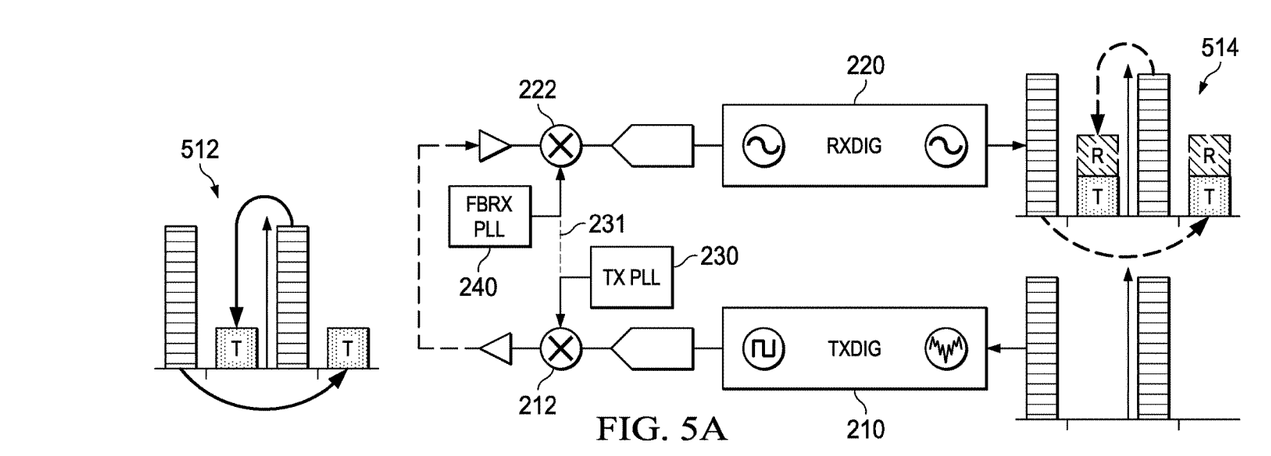
(FIG. 5A) illustrates reconfiguring the transceiver for separate TX/FBRX PLLs, including generation of TX/FBRX images based on IQ imbalance.
Figure 5B:
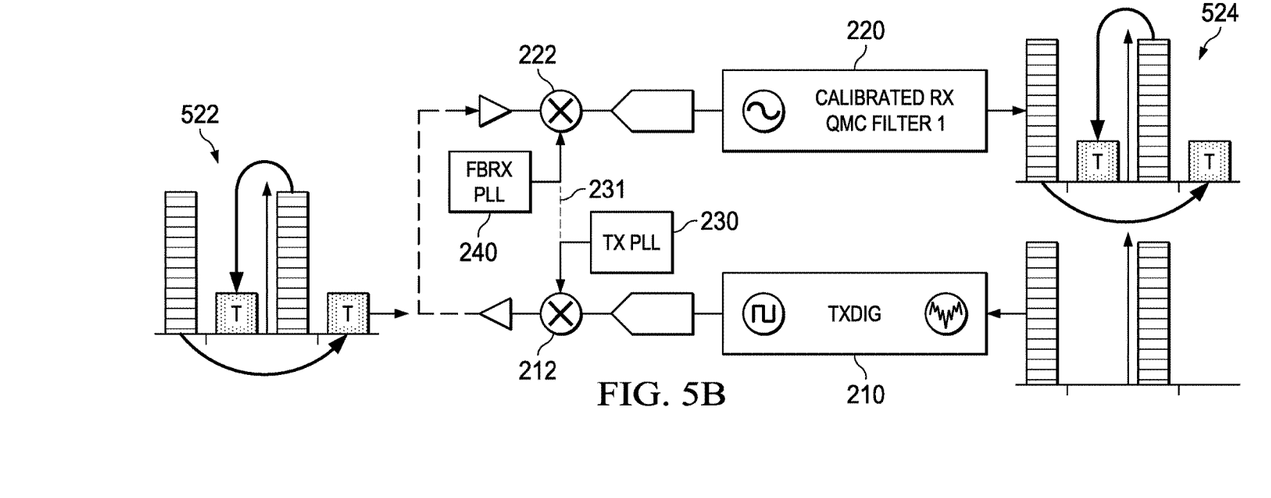
(FIGS. 5B-5C) illustrate sequential FBRX and TX QMC calibration using separate TX/FBRX PLLs, to suppress FBRX and TX images.
Figure 5C:
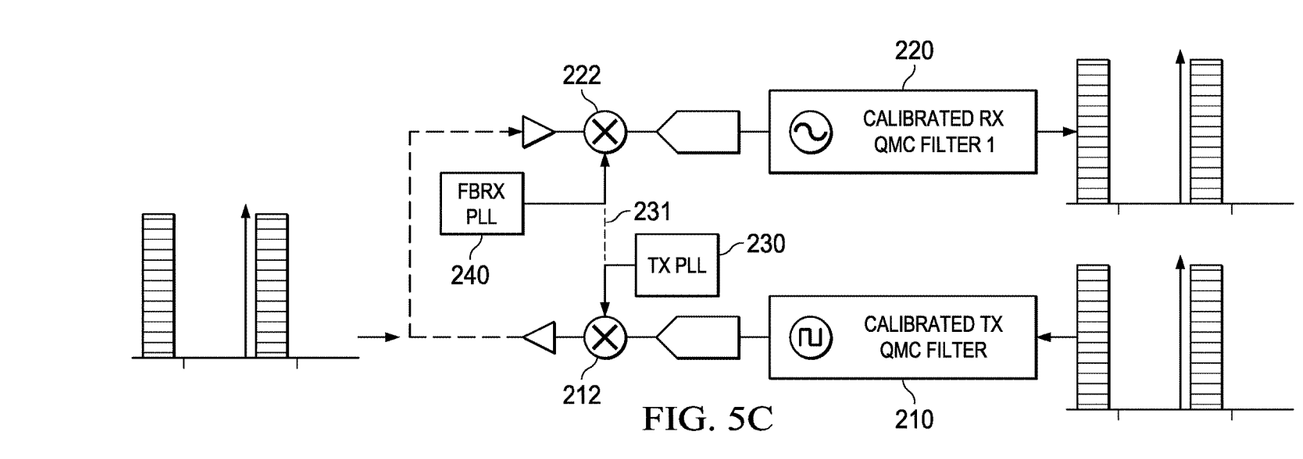
Figure 5D:
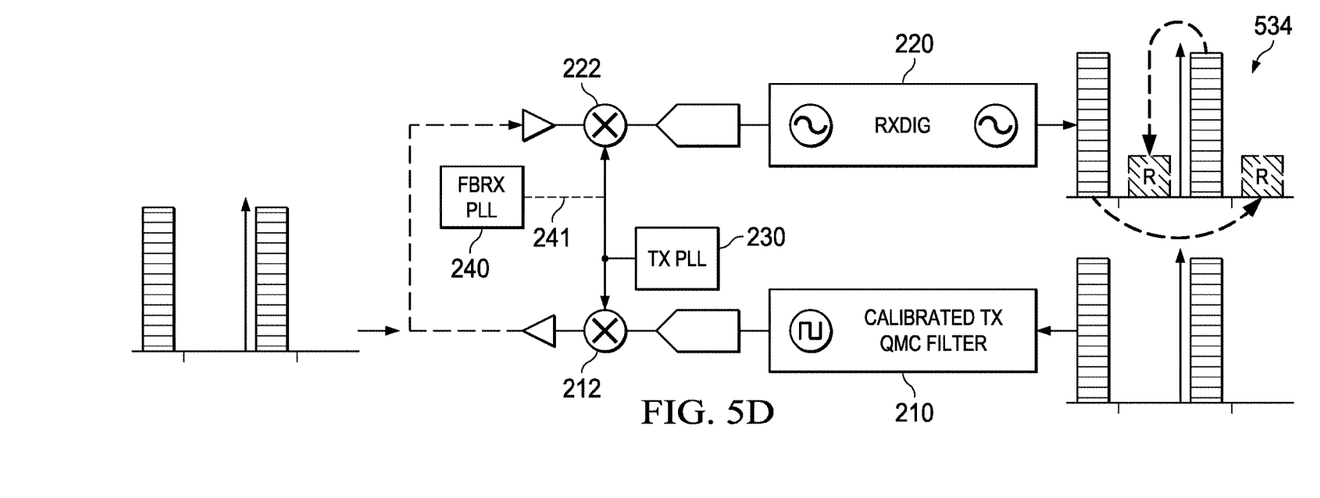
(FIG. 5D) illustrates re-configuring the transceiver to use the shared TX PLL for FBRX and TX LO generation (FBRX image reappears)
Figure 5E:
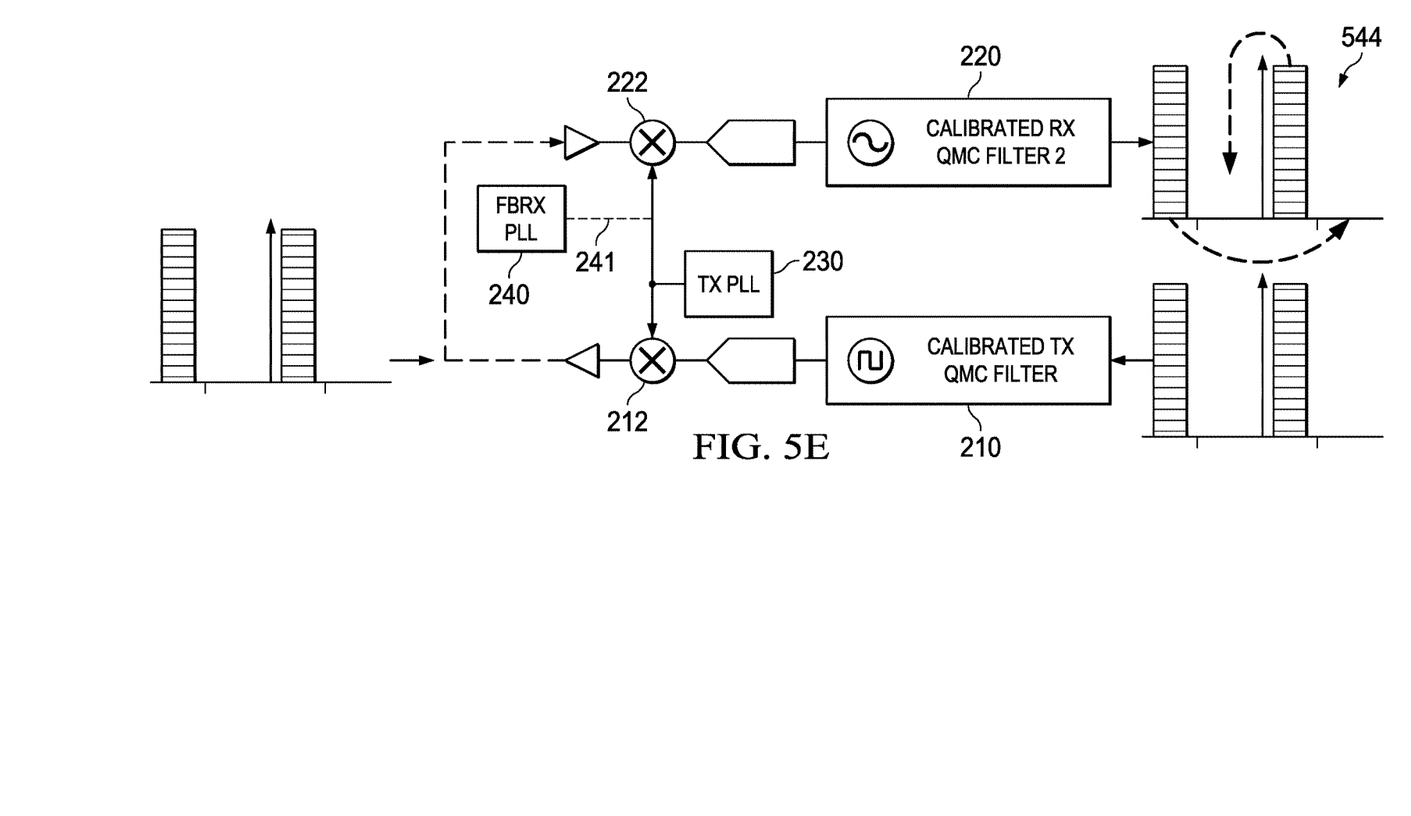
(FIG. 5E) illustrates FBRX QMC re-calibration to suppress the FBRX image caused by the transition to the shared TX PPL, enabling normal mode transceiver TX/FBRX signal path operation with the shared TX PLL for TX/FBRX LO generation, and including QMC compensation (with updated FBRX/TX QMC filter coefficients).

FIGS. 4 and 5A-5E illustrate TX/FBRX sequential QMC calibration using separate/shared PLLs, using the transceiver TX/FBRX configuration of FIG. 3, with separate TX and FBRX PLLs 230, 240 for Joint TX/FBRX QMC Filter Calibration (coefficient generation), and then transitioning to the transceiver TX/FBRX configuration of FIG. 2 using a shared TX PLL 230 as the signal source for both TX and FBRX LO generation (both TX and RX mixers 212, 222) for DPD adaptation (although, requiring FBRX QMC re-calibration, as described in connection with FIGS. 5D-5E).

FIG. 4 illustrates a sequence of TX/FBRX QMC calibration routines, designated A-E to correlate with FIGS. 5A-5E, that are run before DPD adaptation/compensation in normal operation mode based on TX and FBRX signal path IQ modulation/demodulation using a shared TX PLL. These routines implement the TX/FBRX sequential QMC calibration methodology using separate/shared TX/FBRX PLLs, including calibration of TX and FBRX QMC filter coefficients.

FIGS. 5A-5E (corresponding to FIG. 4, Routines A-E) illustrate the methodology for TX/FBRX sequential QMC calibration using separate/shared TX/FBRX PLLs, including the sequence of TX/FBRX QMC calibration/re-calibration routines in FIG. 4 A-E for computing TX/FBRX QMC filter coefficients prior to DPD adaptation/compensation.

FIG. 5A illustrates reconfiguring the transceiver for separate TX/FBRX PLLs, including generation of TX/FBRX images based on IQ imbalance. Referring also to FIG. 4 Routine A, the transceiver TX and FBRX paths 210, 220 are switched to the FIG. 2 transceiver configuration by disconnecting the TX PLL 230 from the FBRX mixer 222 (FBRX LO) (dashed line 231), and connecting the FBRX PLL 240 as the signal source for the FBRX LO driving the FBRX mixer 222. Due to IQ imbalances of TX path 210 and RX path 220, TX and RX images are overlapped on top of to each other 512/514.

FIGS. 5B-5C illustrate sequential FBRX and TX QMC calibration using separate TX/FBRX PLLs 230/240, to suppress the overlapped TX/FBRX images (FIG. 5A). Referring also to FIG. 4 Routines B-C, this sequence of QMC filter calibration (coefficient generation) routines can be accomplished using the above referenced Joint TX/FBRX QMC Calibration methodology (including phase rotation).

FIG. 5B illustrates FBRX QMC filter calibration. Referring also to FIG. 4 Routine B, FBRX QMC calibration routine is run to update QMC filter coefficients for the FBRX path. This configuration routine eliminates images from RX path 522, 524 induced by FBRX LO sourced from FBRX PLL 240, for example using the above referenced Joint TX/FBRX QMC Calibration methodology (including phase rotation).

FIG. 5C illustrates TX QMC filter configuration. Referring also to FIG. 4 Routine C, a TX QMC configuration routine is run to update TX QMC filter coefficients for the TX path 210. This configuration routine eliminates images from TX path 210 induced by the TX LO sourced from the TX PLL.

FIGS. 5D-5E transition from the dual TX/FBRX PLL configuration of FIG. 3, to the signal TX PLL configuration of FIG. 2 to complete QMC calibration/re-calibration (coefficient generation) in preparation for normal mode operation, including DPD adaptation.

FIG. 5D (FIG. 4 Routine D) illustrates re-configuring the transceiver TX/FBRX 210, 220 to use the shared TX PLL 230 for both TX and FBRX LO generation (212, 222), disconnecting the separate FBRX PLL 240 (dashed line 241). QMC filter coefficients, calibrated under FIG. 5B with the FBRX PLL 240 as the signal source in RX path 220, become invalid, and an RX image re-appears 534.

FIG. 5E (FIG. 4 Routine E) illustrates FBRX QMC re-calibration, performed to suppress the FBRX image 544. FBRX QMC re-calibration can be accomplished, for example, using adaptive least squares.

After TX/FBRX sequential QMC calibration using separate/shared TX/FBRX PLLs as illustrated in FIGS. 5A-5E (FIG. 4 Routines A-E), normal operation for the transceiver TX/FBRX signal path is enabled, including QMC compensation (using updated FBRX/TX QMC filter coefficients) to suppress TX/FBRX images, and DPD adaptation/compensation. TX/FBRX signal path IQ modulation/demodulation uses a shared TX PLL 230 as the signal source for the TX/FBRX LOs driving the TX/FBRX mixers 212, 222.

The Disclosure provided by this Description and the Figures sets forth example embodiments and applications illustrating aspects and features of the invention, and does not limit the scope of the invention, which is defined by the claims. Known circuits, functions and operations are not described in detail to avoid obscuring the principles and features of the invention. These example embodiments and applications can be used by ordinarily skilled artisans as a basis for modifications, substitutions and alternatives to construct other embodiments, including adaptations for other applications.

The invention claimed is:

1. A wireless transceiver circuit, comprising
a transmit (TX) signal chain to transmit TX radio frequency (TXRF) signals, including
an IQ modulator, and
an RF upconverter including a TX mixer driven by a TX local oscillator (TX LO),
a TX QMC compensator to
in TX QMC compensation mode, perform TX QMC compensation for TX IQ mismatch based on TX QMC filter coefficients, and
in QMC calibration mode, calibrate the TX QMC filter coefficients based on a QMC calibration procedure;
a receive (RX) signal chain to receive at least feedback TXRF (FBRX) signals including
an IQ demodulator, and
an RF downconverter including an RX mixer driven by a RX local oscillator (RX LO),
an RX QMC compensator to
in RX QMC compensation mode, perform RX QMC compensation for RX IQ mismatch based on RX QMC filter coefficients, and
in QMC calibration mode, calibrate the RX QMC filter coefficients based on a QMC calibration procedure;
separate TX PLL (phase-locked loop) and FBRX PLL signal sources,
in normal operating mode, the TX PLL signal source connected to the TX LO, and selectively connected to the RX LO;
in QMC calibration mode, the TX PLL selectively disconnected from the RX LO, and the FBRX PLL signal source selectively connected to the RX LO;
a QMC controller to perform the QMC calibration procedure to generate calibrated TX and RX QMC filter coefficients, including
disconnecting the TX PLL from, and connecting the FBRX PLL to, the RX LO, and then
generating calibrated RX QMC filter coefficients, and
generating calibrated TX QMC filter coefficients, and then
disconnecting the FBRX PLL from, and connecting the TX PLL to, the RX LO, and then
generating re-calibrated RX QMC filter coefficients.

2. The circuit of claim 1, further comprising a DPD (digital pre-distortion) compensator to perform, in normal operating mode, TX DPD compensation using TX data and FBRX data respectively based on TX QMC compensation and RX QMC compensation.

3. The circuit of claim 2, wherein TX QMC compensation and RX QMC compensation are performed prior to TX DPD compensation.

4. The circuit of claim 2, wherein TX QMC compensation is selectively performed independent of selectively performing RX QMC compensation.

5. The circuit of claim 1, wherein the QMC calibration procedure generates the calibrated TX QMC filter coefficients and the calibrated RX QMC filter coefficients based on phase rotation.

6. The circuit of claim 1, wherein the QMC calibration procedure generates the re-calibrated RX QMC filter coefficients using least squares.

7. A wireless transmitter circuit, comprising
a transmit (TX) signal chain to transmit a TX wireless signal, including
an IQ modulator, and
an RF upconverter including a TX mixer driven by a TX local oscillator (TX LO),
a TX digital compensator, including
a TX QMC compensator for IQ mismatch compensation
in normal operating mode, to perform TX QMC compensation for TX IQ mismatch based on TX QMC filter coefficients,
in QMC calibration mode, calibrate the TX QMC filter coefficients based on a QMC calibration procedure, and
a DPD (digital pre-distortion) compensator to perform TX DPD compensation in TX operating mode;
a receive (RX) signal chain receiving the TX wireless signal including
an IQ demodulator, and
an RF downconverter including an RX mixer driven by a RX local oscillator (RX LO),
an RX digital compensator, including an RX QMC compensator operable
in normal operating mode, to perform RX QMC compensation for RX IQ mismatch based on RX QMC filter coefficients,
in QMC calibration mode, to calibrate the RX QMC filter coefficients based on a QMC calibration procedure;
the TX digital compensator performing TX DPD compensation in TX operating mode using TX data and FBRX data respectively based on TX QMC compensation and RX QMC compensation;
separate TX PLL (phase-locked loop) and FBRX PLL signal sources,
in normal operating mode, the TX PLL signal source connected to the TX LO, and selectively connected to the RX LO;
in QMC calibration mode, the TX PLL selectively disconnected from the RX LO, and the FBRX PLL signal source selectively connected to the RX LO;
a QMC controller to perform the QMC calibration procedure to generate calibrated TX and RX QMC filter coefficients, including
disconnecting the TX PLL from, and connecting the FBRX PLL to, the RX LO, and then
generating calibrated RX QMC filter coefficients, and
generating calibrated TX QMC filter coefficients, and then
disconnecting the FBRX PLL from, and connecting the TX PLL to, the RX LO, and then
generating re-calibrated RX QMC filter coefficients.
8. The circuit of claim 7, wherein TX QMC compensation and RX QMC compensation are performed prior to the DPD compensator performing TX DPD compensation.

9. The circuit of claim 7, wherein TX QMC compensation is selectively performed independent of selectively performing RX QMC compensation.
10. The circuit of claim 7, wherein the QMC controller, during the QMC calibration procedure, generates the calibrated TX QMC filter coefficients and the calibrated RX QMC filter coefficients based on phase rotation.
11. The circuit of claim 7, wherein the QMC controller, during the QMC calibration procedure, generates the re-calibrated RX QMC filter coefficients using least squares.
12. A method for direct conversion wireless communication, comprising
transmitting through a TX signal chain a TX wireless signal, including performing IQ modulation, RF upconversion using a TX mixer driven by a TX local oscillator (TX LO); and
receiving through an RX signal chain, a RX feedback (FBRX) wireless signal corresponding to the TX wireless signal, including performing IQ demodulation, and RF downconversion using a RX mixer driven by an RX local oscillator (RX LO);
in a TX operating mode to transmit the TX wireless signal,
driving the TX LO and the RX LO with a TX PLL (phase-locked loop) signal,
performing TX QMC compensation for IQ mismatch based on TX QMC filter coefficients,
performing FBRX QMC compensation on the FBRX wireless signal for RX IQ mismatch based on RX QMC filter coefficients, and
performing TX DPD (digital pre-distortion) compensation using TX data and FBRX data respectively based on TX QMC compensation and FBRX QMC compensation;
in a QMC calibration mode, performing a QMC calibration procedure to calibrate respectively the TX QMC filter coefficients and RX QMC filter coefficients, including
driving the TX LO with the TX PLL signal, and driving the RX LO with a FBRX PLL signal, and then
generating calibrated RX QMC filter coefficients, and
generating calibrated TX QMC filter coefficients, and then
driving the TX LO and the RX LO with the TX PLL signal, and then
generating re-calibrated RX QMC filter coefficients.
13. The method of claim 12, wherein during the QMC calibration procedure, the calibrated TX QMC filter coefficients and the calibrated RX QMC filter coefficients are generated based on phase rotation.
14. The method of claim 12, wherein, during the QMC calibration procedure, the re-calibrated RX QMC filter coefficients are generated using least squares.
15. The method of claim 12, wherein TX QMC compensation is selectively performed independent of selectively performing RX QMC compensation.

* * * * *